tates Patent Office 3,397,967
Patented Aug. 20, 1968

3,397,967
DITHIOBIS(PHOSPHONOTHIOIC DIFLUO-
RIDE), P₂S₄F₄, AND ITS METHOD OF
PREPARATION
Herbert W. Roesky, Gottingen, Germany, assignor to E. I.
du Pont de Nemours and Company, Wilmington, Del.,
a corporation of Delaware
No Drawing. Filed Aug. 3, 1966, Ser. No. 569,847
2 Claims. (Cl. 23—357)

ABSTRACT OF THE DISCLOSURE

Dithiobis(phosphonothioic difluoride) prepared by contacting bromine with an alkali metal phosphorodifluoridodithioate which is useful as a chemical reducing agent is claimed.

Description of the invention

This invention relates to a new inorganic compound and a process for its preparation.

The new compound is $P_2S_4F_4$, dithiobis(phosphonothioic difluoride). Its structural formula is as follows:

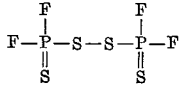

It can be prepared by the bromine oxidation of an alkali metal phosphorodifluoridodithioate, $MPF_2S_2$, of the formula

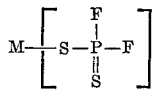

in which M is an alkali metal, i.e., Li, Na, K, Rb, Cs or Fr. Such alkali metal phosphorodifluoridodithioates are fully described and claimed in my copending U.S. application filed concurrently herewith. In brief, they are prepared by reacting phosphorus pentasulfide, $P_4S_{10}$, with an alkali metal fluoride in acetonitrile.

Dithiobis(phosphonothioic difluoride) is a colorless liquid which is useful as a chemical reducing agent. Thus, in a neutral or alkaline system it reduces permanganate to $MnO_2$, and in an acid system it reduces permanganate to manganous ion.

The oxidation process can be carried out by contacting bromine in liquid or vapor form with an alkali metal phosphorodifluoridodithioate. For convenience in dissipating the heat of reaction, it is preferable to conduct the oxidation in the presence of a liquid reaction medium which is inert to the reactants and products. Suitable media include ethers such as diethyl ether, dibutyl ether, tetrahydrofuran and the like. The product is recovered from the reaction mixture by known means, such as extraction, distillation, and the like.

Temperature and pressure are not critical factors in the reaction. Temperatures in the range from −40 to 150° C. are preferred. Pressures both above and below atmospheric pressure are operable, and atmospheric pressure is preferred for convenience.

The molar ratio in which the alkali metal phosphorodifluoroidodithioate and bromine are brought together in carrying out the reaction may be varied widely, i.e., from 1:20 to 20:1. Molar ratios in the range of 1:2 to 2:1 are preferred.

The following example illustrates a preferred embodiment of the invention. Parts are by weight unless otherwise specified.

EXAMPLE

Part A.—To a slurry of 2 g. of CsF in 15 ml. of acetonitrile $SPF_3$ was added slowly at roo temperature until it was no longer absorbed. During the reaction CsPF was precipitated. The mixture was allowed to stand overnight. The $CsPF_6$ was removed by filtration. The filtrate was evaporated under reduced pressure to obtain cesium phosphorodifluoridodithioate, $CsPF_2S_2$, as a crystalline solid. Its identity was confirmed by infrared absorption, nuclear magnetic resonance, and elemental analysis. The other alkali metal phosphorodifluoridodithioates are obtained by substituting LiF, NaF, KF, RbF, or FrF for CsF in this procedure.

Part B.—To a stirred mixture of 11 g. of $CsPF_2S_2$ and 50 ml. of dry ether was added 3.3 g. of bromine in small portions. The bromine color disappeared rapidly after each addition. The mixture was then filtered and ether removed from the filtrate by evaporation under reduced pressure. The liquid residue was distilled to obtain 4 g. of dithiobis(phosphonothioic difluoride), $P_2F_4S_4$, in the form of a colorless liquid boiling at 76° C. and 24 mm., 58–60° C. and 10 mm., and at 30° C. and 1 mm. pressure. The $F^{19}$ nuclear magnetic resonance spectrum consisted of a doublet, $J_{P-F}=1275$ cps., $\delta_F=+27.8$ p.p.m. with respect to the external standard $CCl_3F$. The $31_p$ nuclear magnetic resonance spectrum consisted of a triplet, $\delta_p=-72.6$ p.p.m. with respect to the external standard 85% $H_3PO_4$.

Analysis.—Calcd. for $P_2F_4S_4$: P, 23.3; F, 28.6; S, 48.1; M.W., 266. Found: P, 23.50; F, 28.27; S, 47.97; M.W., 260 (in benzene).

The foregoing detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property or privilege is claimed are defined as follows:

1. Dithiobis represented by the formula $P_2S_4F_4$.
2. Preparation of dithiobis which comprises contacting an alkali metal phosphorodifluoridodithioate with bromine in a molar ratio of from 1:20 to 20:1 at a temperature of at least −40° C.

References Cited

UNITED STATES PATENTS 2,312,413   3/1943   Iler _____ 23—50

OSCAR R. VERTIZ, Primary Examiner.

H. S. MILLER, Assistant Examiner.

UNITED STATES PATENT OFFICE
CERTIFICATE OF CORRECTION

Patent No. 3,397,967                          August 20, 1968

Herbert W. Roesky

It is certified that error appears in the above identified patent and that said Letters Patent are hereby corrected as shown below:

Column 2, line 49, after "Dithiobis" insert -- (phosphonothioic difluoride), --; line 50, after "dithiobis" insert -- (phosphonothioic difluoride) --.

Signed and sealed this 17th day of February 1970.

(SEAL)
Attest:

Edward M. Fletcher, Jr.                        WILLIAM E. SCHUYLER, JR.

Attesting Officer                                     Commissioner of Patents